United States Patent
Drujon et al.

(10) Patent No.: US 6,723,779 B2
(45) Date of Patent: Apr. 20, 2004

(54) LOW-TEMPERATURE FILM-FORMING LATEX BASED ON HYDROPHOBIC POLYMERS HAVING A CORE/SHELL STRUCTURE WITHOUT COALESCENTS

(75) Inventors: Xavier Drujon, Bosdarros (FR); Pascale Fabre, Paris (FR); Ludwik Leibler, Paris (FR); Gilles Meunier, Mazerolles (FR); Fabrice Domingues Dos Santos, Paris (FR)

(73) Assignee: Elf Atochem S.A., Puteaux (FR)

(*) Notice: Subject to any disclaimer, the term of this patent is extended or adjusted under 35 U.S.C. 154(b) by 8 days.

(21) Appl. No.: 10/134,470

(22) Filed: Apr. 30, 2002

(65) Prior Publication Data

US 2002/0132055 A1 Sep. 19, 2002

Related U.S. Application Data

(62) Division of application No. 09/469,185, filed as application No. PCT/FR98/01859 on Aug. 27, 1998, now Pat. No. 6,531,185.

(30) Foreign Application Priority Data

Aug. 28, 1997 (FR) .............................. 97 10762

(51) Int. Cl.[7] .......................... C08L 51/00; C08L 9/10; C08L 33/06
(52) U.S. Cl. .................. 524/504; 524/819; 524/821; 524/823; 524/834; 523/201; 523/205
(58) Field of Search ................... 523/201, 205; 524/504, 823, 821, 819, 834

(56) References Cited

U.S. PATENT DOCUMENTS

| | | | |
|---|---|---|---|
| 3,808,180 A | * | 4/1974 | Owens |
| 5,082,732 A | | 1/1992 | Ueda et al. |
| 5,403,884 A | | 4/1995 | Tsai et al. |
| 5,403,894 A | * | 4/1995 | Tsai et al. |
| 5,424,341 A | | 6/1995 | Ogoe et al. |
| 5,500,457 A | * | 3/1996 | Sarkar et al. |
| 5,631,323 A | | 5/1997 | Guntherberg et al. |
| 5,866,657 A | * | 2/1999 | Tominaga et al. |

FOREIGN PATENT DOCUMENTS

| | | |
|---|---|---|
| DE | 41 39 382 A | 8/1992 |
| EP | 0 522 791 A | 1/1993 |
| FR | 2 729 150 | 7/1996 |

OTHER PUBLICATIONS

Polymer Handbook, "Glass Transition Temperatures of Polymers", J. Brandrup & E.H Immergut. pp. III–66 to 71, Interscience Publishers, 1966.*

* cited by examiner

Primary Examiner—Tae H. Yoon
(74) Attorney, Agent, or Firm—Smith, Gambrell & Russell, LLP

(57) ABSTRACT

A latex which forms a film by evaporation at a temperature of less than 40° C. is based on hydrophobic polymer particles having a core/shell structure. The particles consist of 70 to 90% by weight of at least one polymer with a soft character having a glass transition temperature of less than 20° C. forming the core, and 10 to 30% by weight of at least one polymer with a hard character having a glass transition temperature of greater than 50° C. forming the shell. When applied to any surface and after drying at low temperature, the latex, without the use of any coalescents or volatile organic compounds, provides a continuous film which is homogeneous, has no surface tack and has good mechanical integrity.

7 Claims, 4 Drawing Sheets

Figure 1A:
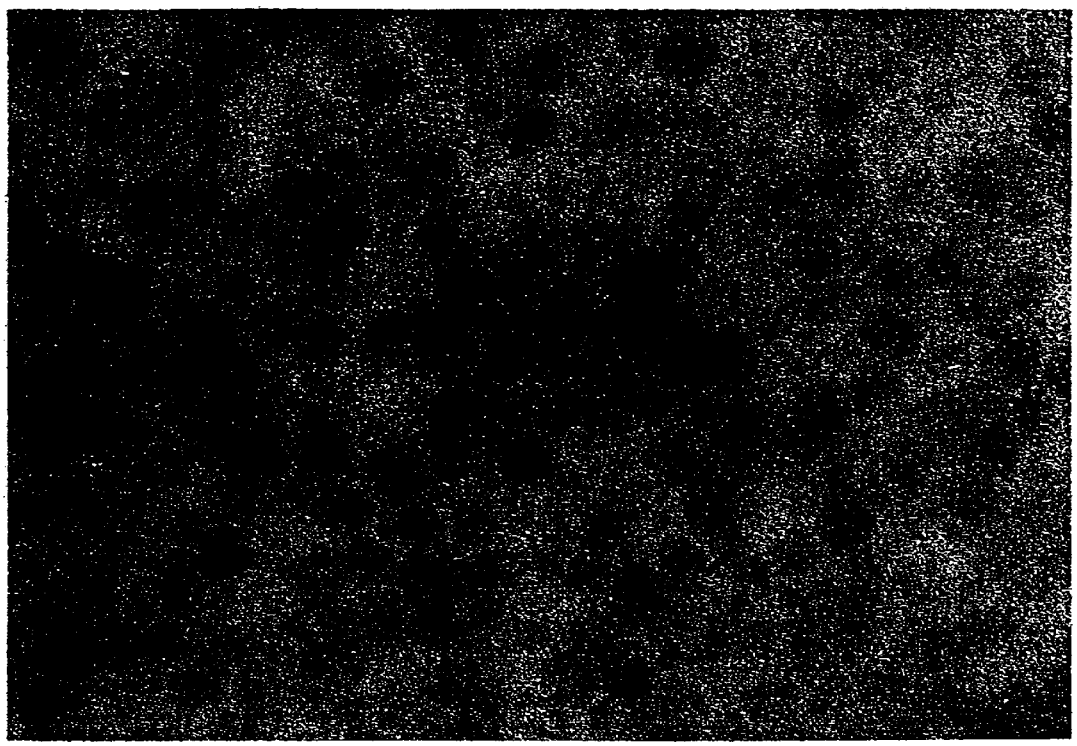

LOW-TEMPERATURE FILM-FORMING LATEX BASED ON HYDROPHOBIC POLYMERS HAVING A CORE/SHELL STRUCTURE WITHOUT COALESCENTS

CROSS REFERENCE TO RELATED APPLICATIONS

This application is a division of Ser. No. 09/469,185, filed May 5, 2000, now U.S. Pat. No. 6,531,185 which is a 371 national stage filing of PCT/FR98/01859 filed Aug. 27, 1998, both of which are being incorporated herein by reference.

The invention relates to the field of surface treatment and in particular to hydrophobic thermoplastic films for surface coatings and more particularly to films obtained by low-temperature drying of a latex containing neither volatile organic compounds nor coalescents.

BACKGROUND OF THE INVENTION

In the context of the invention, the term "latex" should be understood to mean an aqueous dispersion of polymer particles which can be obtained by the emulsion polymerization of one or more monomers.

Many latices are intended for the building, paper, textile and leather industries and are used in the surface treatments of various materials, particularly as paints, varnishes, adhesives and mastics. More generally, such latices are required to have a minimum film-forming temperature, called hereafter MFT, as low as possible. The MFT is the lowest temperature at which the particles form a continuous film after the water has been evaporated.

When the polymers constituting the particles dispersed in a latex have a relatively low glass transition temperature, denoted by $T_g$, it is easy for the latex to form a film at room temperature but the films obtained are tacky and their mechanical integrity is poor. On the other hand, if the polymers have a high $T_g$, the films will be of better quality but film formation at room temperature would require the addition of a coalescents. The latter is generally a volatile organic compound which evaporates during application and film formation, as described in U.S. Pat. Nos. 4,455,402 and 5,021,469.

For obvious environmental-friendliness and cost-reduction reasons, it is desirable to develop latices containing neither volatile organic compounds nor coalescents, having a relatively low MFT and able to give films at low temperature which have no surface tack and are of good mechanical quality.

To achieve this objective, EP 466,409 proposes a solution based on a mixture of two latices, one having a low $T_g$, generally called a "soft" latex providing film formation and the other having a high $T_g$, generally called a "hard" latex providing mechanical integrity. U.S. Pat. No. 263,193 describes a solution based on a shell/core latex with a shell having a "soft" character and a core having a "hard" character. Unlike the previous document, EP 609,756 describes a latex, prepared in two steps, having a "soft" core with a $T_g$ ranging from −5° C. to −55° C. and a "hard" shell with a $T_g$ of less than 50° C.

Likewise, FR 2,090,483 describes a latex, obtained by two-step polymerization, consisting of 35 to 50% of a polymer, obtained in the first step, having a $T_g$ of less than 10° C. and of 50 to 65% of a polymer, obtained in the second step, having a $T_g$ of greater than 60° C., the first-step polymer being crosslinked and fastened to the second.

DETAILED DESCRIPTION OF THE INVENTION AND BRIEF DESCRIPTION OF DRAWINGS

Applicant has found that an ingenious solution to the problem described above entails a latex containing particles of hydrophobic polymers having a core/shell structure. With a so-termed "soft" core having a $T_g$ of less than 20° C. and a so-termed "hard" shell having a $T_g$ of greater than 50° C. The Applicant has in fact discovered that, as long as the mass contribution of the shell to the total weight of the polymer particles does not exceed 30%, such a latex applied to any surface gives, after drying at low temperature, and without the use of coalescents or volatile organic compounds, a continuous film which has a structure in the form of soft parts dispersed in a hard matrix, is homogeneous, has no surface tack and has good mechanical integrity.

In general, hydrophobicity is the non-solubility in water or the lack of affinity with respect to water. According to the invention, this lack of affinity may be hierarchized. This is because the hydrophobicity according to the invention is defined by the solubility parameter; (delta) as described in "Properties of polymers" by D. W. Van Krevelen, 1990, 3rd edition, page 220. This parameter makes it possible to classify various polymers according to their affinities with respect to water. According to the invention, a polymer is hydrophobic if its (delta) is less than 26. In addition, if (delta1) of a polymer 1 is less than (delta2) of a polymer 2, then 1 is more hydrophobic than 2.

One of the subjects of the invention is a hydrophobic thermoplastic film consisting of 70 to 90% by weight of a polymer (P1) with a soft character having a $T_g$ of less than 20° C. dispersed in 10 to 30% of a polymer (P2) with a hard character having a $T_g$ of greater than 50° C.

The polymer P1 is dispersed in the form of individualized nodules in the matrix consisting of the polymer P2.

The film of the invention is hydrophobic in the context of the invention defined above; in addition, P1 is more hydrophobic than P2.

Preferably, P1 has a $T_g$ of less than 0° C. and P2 a $T_g$ of greater than 60° C.

Figure 1B:
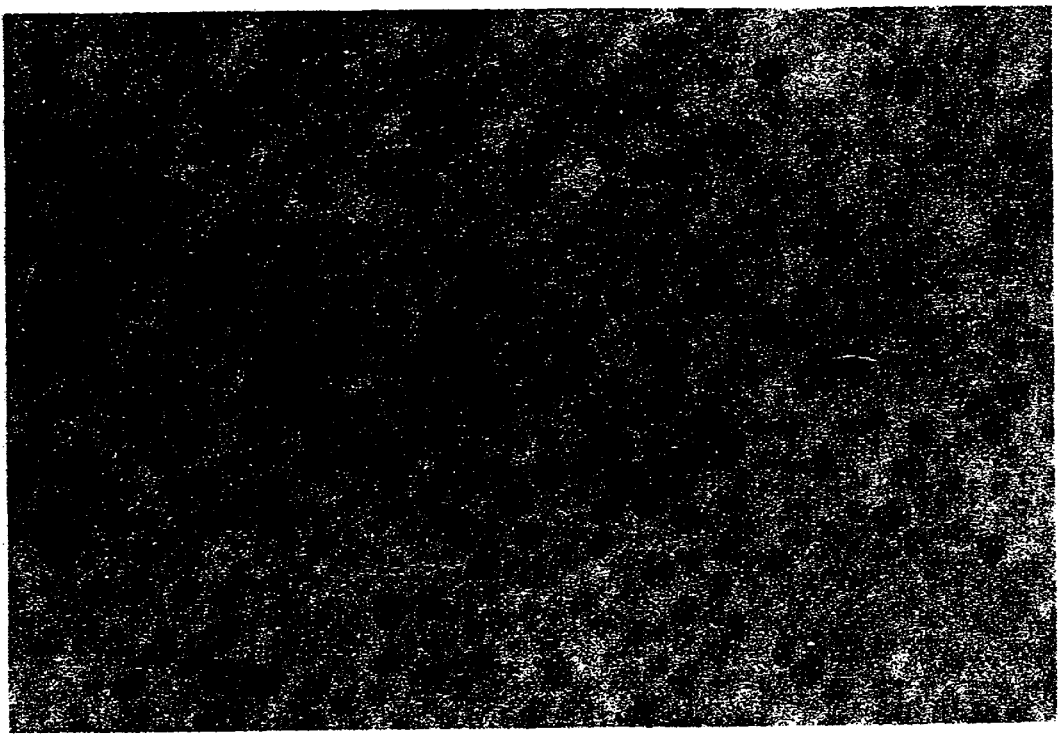
Figure 2:
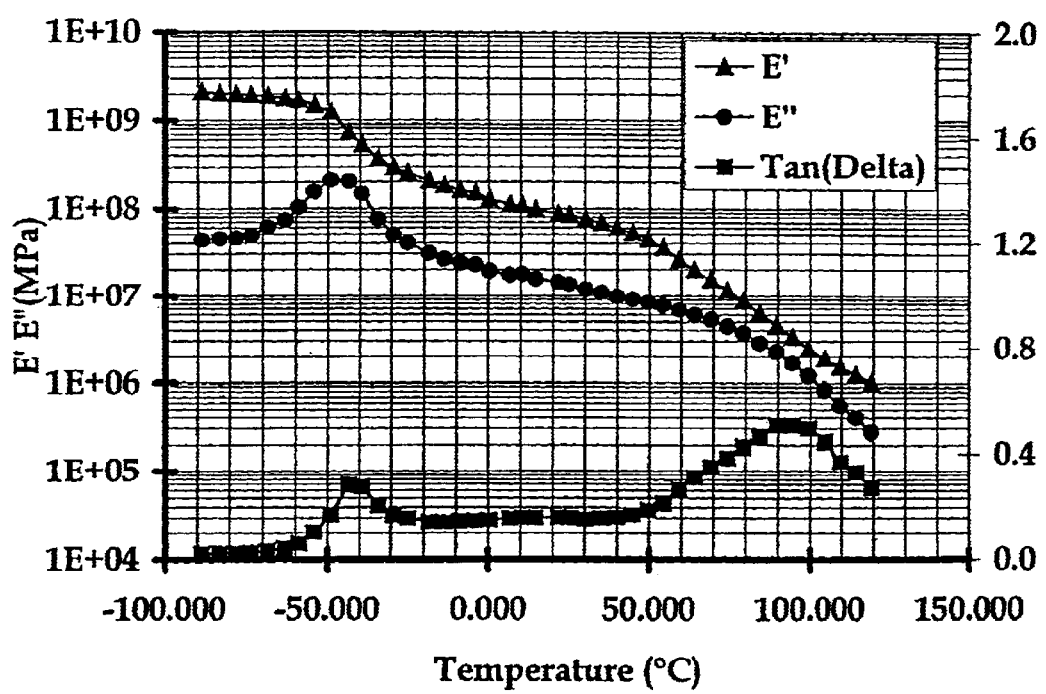
Figure 3:
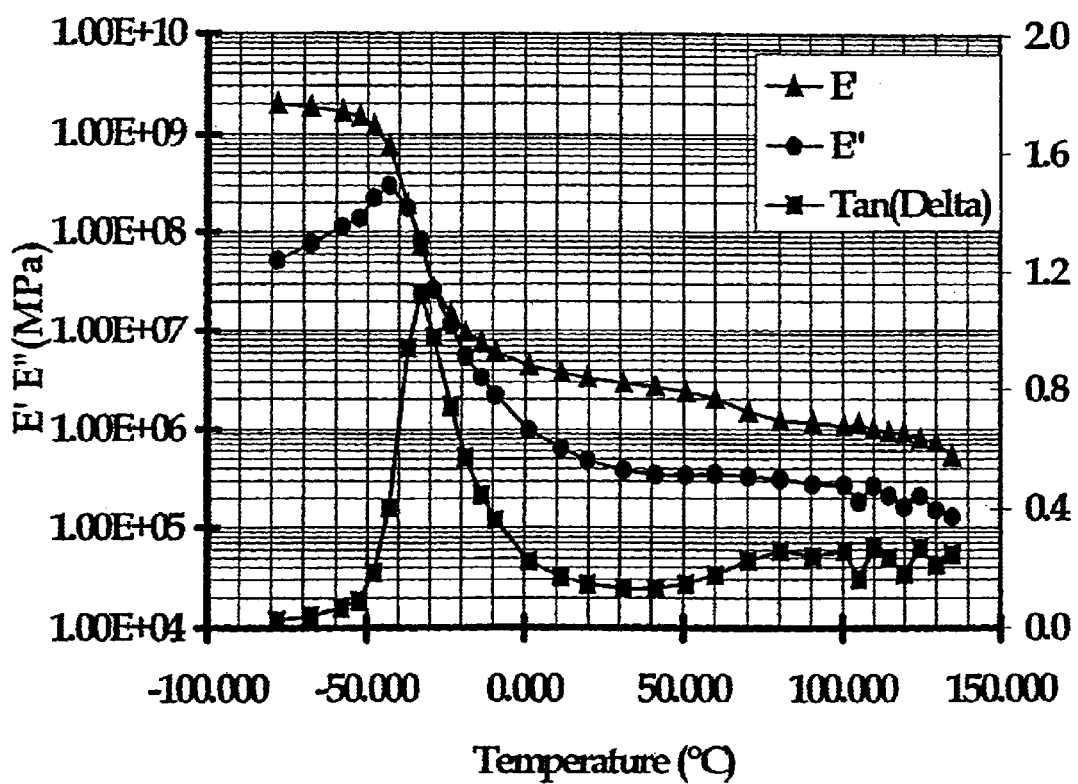

The film of the invention may be characterized by two separate techniques. The first is transmission electron microscopy, an example of which, corresponding to the invention, is given in FIGS. 1A and 1B. An 80 nm-thick section cut from a film is stained with a reagent specific to the Polymer P1. This appears darker while the polymer P2 appears lighter. In FIGS. 1A and 1B, it may be clearly seen that the structure of the film is indeed that described above, that is to say comprising individualized nodules of P1 dispersed in a continuous matrix of P2. The second technique is dynamic thermomechanical analysis (DMA), an example of which, corresponding to the film described above, is given in FIG. 2. This shows that the loss tangent exhibits two peaks characteristic of the presence of two separate phases in the material. Moreover, measurement of a Young's modulus E' at room temperature greater than $1 \times 10^8$ Pa shows that the film does not have any surface tack and that, given the respective proportions of polymers P1 and P2 in the film, it is the "hard" polymer P2 which constitutes the continuous phase. FIG. 3 shows DMA of a film obtained from a 80% PBuA/20% PMMA latex mixture with E' less than $1 \times 10^7$ indicating the presence of surface tack.

The polymers forming the films of the invention may be prepared by two-step emulsion polymerization as described below and essentially consist of units derived from the polymerization of monomers chosen from group I consisting of:

$C_1$–$C_8$ (meth)acrylic acid esters;

vinyl esters of linear or branched carboxylic acids, such as vinyl acetate and vinyl stearate;

styrene and its derivatives, such as chloromethylstyrene, alpha-methylstyrene, etc.;

conjugated dienes, such as butadiene and isoprene;

acrylamide, methacrylamide and acrylonitrile;

vinyl chloride;

(meth) acrylic acids and their derivatives, such as omhydrides.

The choice of monomers, both for the soft polymer and for the hard polymer, is dependent on the properties, such as the hydrophobicity and the $T_g$, that it is desired to confer on the polymer in question. For example:

the $T_g$ of a polymer may be estimated a priori by Fox's law, namely $$1/T_g = wa/T_g(a) + wb/T_g(b) + \ldots$$

where w(a) and w(b) are the mass fractions of monomers a and b and $T_g(a)$ and $T_g(b)$ are the glass transition temperatures of the corresponding homopolymers. $T_g(a)$ and $T_g(b)$ are taken from literature, such as from the "Polymer Handbook", 3rd edition, 1989.

For each polymer to be prepared, the monomer or the nature and composition of the monomer mixture when it involves several monomers are determined so as to obtain the desired $T_g$.

Thus, in order to prepare the polymer having a "hard" character, the monomer mixture to be polymerized may consist mostly of at least one monomer chosen from the group consisting of: methylmethacrylate, styrene and vinyl chloride.

Likewise, for the polymer with a "soft" character, the monomer mixture may consist mostly of at least one monomer chosen from the group consisting of butyl acrylate, butadiene and isoprene.

The soft and hard parts may be crosslinked by means of monomers having at least two copolymerizable double bonds. These monomers may be chosen from group II consisting of:

a) conjugated dienes, such as butadiene and isoprene;

b) allyl esters of unsaturated carboxylic or alpha, beta-dicarboxylic acids, such as allyl acrylate, allyl methacrylate or diallyl maleate;

c) polyacrylics or polymethacrylics, such as ethylene glycol dimethacrylate, 1,3-butylene glycol dimethacrylate, 1,4-butanediol diacrylate and pentaerythritol tetraacrylate;

d) polyvinyls, such as divinylbenzene or trivinylbenzene;

e) polyallylics, such as triallyl cyanurate or triallyl trimesate.

Preferably, only the core is crosslinked. The preferred crosslinking monomers according to the invention are butadiene and 1,4-butanediol diacrylate. The content of crosslinking monomers is between 0 and 10% by weight of the total weight of the particles.

The "hard" part may be grafted onto the "soft" part by introducing, in the latter, residues of monomer units. These residues of monomer units are obtained by incorporating, into the "soft" part, grafting monomers chosen either from group II a), namely conjugated dienes, the residues of monomer units resulting from the partial incorporation in the 1, 2 position of the diene during the polymerization, or from the group II b), namely allyl esters of unsaturated carboxylic or alpha, beta-dicarboxylic acids, which have two different copolymerizable functional groups of reactivity.

The preferred grafting monomers according to the invention are butadiene, allyl methacrylate and diallyl maleate.

The content of grafting monomers is between 0 and 10% by weight of the total weight of the particles.

One of the means of obtaining the films of the invention is the low-temperature drying, without the help of coalescents or other volatile organic compounds, of a latex whose particles have a core/shell structure.

Another subject of the invention is a latex which contains neither coalescents nor volatile organic compounds and forms a film by evaporation at a temperature of less than 40° C. and preferable close to 25° C., the said latex being based on particles of hydrophobic polymers having a core/shell structure, consisting of:

70 to 90% by weight of at least one polymer with a soft character having a $T_g$ of less than 20° C., forming the core, and;

10 to 30% by weight of at least one polymer with a hard character having a $T_g$ of greater than 50° C., forming the shell.

Preferably, the core has a $T_g$ of less than 0° C. and the shell has a $T_g$ of greater than 60° C. In addition, and in the context of the invention, the core is more hydrophobic than the shell.

The latices of the invention are prepared in two steps, by the emulsion polymerization of a monomer mixture consisting of:

90% to 100% by weight of at least one monomer chosen from group I, and

0% to 10% by weight of at least one monomer chosen from group II.

Generally, the latices of the invention are prepared by emulsion polymerization in at least two steps using the polymerization techniques well known to those skilled in the art.

The composition of the monomer mixture to be polymerized at each step depends on the character that it is desired to give to the polymer formed in this step ($T_g$ and hydrophobicity).

According to the invention, the polymer with a "soft" character and with a $T_g$ of less than 20° C., constituting the core of the particles, is prepared in a first step and then the polymer with a $T_g$ of greater than 50° C., constituting the shell with a "hard" character, is prepared.

It should be noted that, in order for the particles to be perfectly structured, the monomer mixture to be polymerized in order to form the core must be more hydrophobic than that to be polymerized in order to form the shell.

For each step, the polymerization reaction is preferably carried out in an inert atmosphere in the presence of radical iniators. The initiation system used may be an oxidation-reduction system or a thermal or peroxide system, such as tert-butyl hydroperoxide/sodium bisulphate or diisopropyl benzene, the amounts used being between 0.2 and 1% by weight with respect to the total mass of the monomers, preferably between 0.25 and 0.5% by weight.

The emulsion polymerization reaction according to the invention is carried out at a temperature of between 25 and 150° C. and depends on the nature of the initiation system used.

The dispersions according to the invention are preferably prepared using a process of the semicontinuous type, making it possible to limit the compositional derivatives which depend on the differences in reactivity of the various monomers. The monomers, which are either pure or in the form of a pre-emulsion with some of the water and surfactants, is thus generally introduced over a time period ranging from 3 hours 30 minutes to 5 hours. It is also useful, although not absolutely essential, to employ seeding of 1 to 15% of the monomers. The emulsifying systems used in the emulsion polymerization process according to the invention are chosen from the range of emulsifiers having a suitable hydrophilic/lipophilic balance. The preferred systems consist of the combination of an anionic surfactant, such as sodium lauryl sulphate, ethoxylated nonylphenol sulphates, particularly those containing 20–25 mol of ethylene oxide, benzenedodecanesulphonate and ethoxylated fatty alcohol sulphates, and of a nonionic surfactant, such as ethoxylated nonylphenols, particularly those containing 10–40 mol of ethylene oxide, and ethoxylated fatty alcohols.

Another subject of the invention is a process for obtaining films for surface coatings.

This process consists in applying the latex of the invention as it is, without the addition of coalescents or of volatile organic compounds, to any surface and in leaving it to dry at a temperature of between 0 and 40° C. and preferably close to 25° C.

One of the subjects of the invention is a process for obtaining films for the treatment of various surfaces, such as glass, leather and metal, by drying, at a temperature of less than 40° C. and preferably close to 25° C., a latex consisting of particles of polymers having a core/shell structure, characterized in that the drying is carried out without the help of coalescents or of other volatile organic compounds.

The films of the invention may serve as binders in many applications, such as in paints and varnishes, and the surface treatment of glass, wood, leather or paper. They are formulated and/or filled depending on the intended application.

In addition, and for some applications, the materials surface-treated with the films of the invention may contain, on the same side as the said films, another material, such as glass, paper or leather, or an anti-reflection, scratch-resistant or UV-screening film.

EXAMPLES

The following examples illustrate the invention without limiting it.

Example 1
Preparation of a Latex According to the Invention

The preparation is carried out in a 5-liter reactor, fitted with a stirrer and a temperature probe, the reactor having a jacket within which a heat-transfer fluid circulates in order to maintain the temperature of the reactor.

Introduced into this reactor, flushed out beforehand with nitrogen, maintained at room temperature and with stirring, are 1500 g of demineralized water and 4.8 g of disodium hydrogen phosphate, and then 40.05 g of sodium lauryl sulphate as emulsifier are dissolved in this mixture.

Next, the temperature of the contents of the reactor are heated to 57° C. and, while maintaining this temperature, 991.75 g of n-butyl acrylate and 9.2 g of 1,4-butanediol diacrylate are then added simultaneously to the said contents.

The temperature of the reactor is raised to 66° C. and 1.3 g of potassium persulphate dissolved in 12.5 g of water and 0.925 g of sodium bisulphite dissolved in 35 g of water are added to the reaction mixture.

After an induction time of about 15 minutes, the temperature rises to 107° C.

After this exotherm, a mixture consisting of 98.9 g of n-butyl acrylate and 5.48 g of diallyl maleate is added to the reactor maintained at 80° C., followed by 0.15 g of potassium persulphate dissolved in 25 g of water. The temperature is maintained at 80° C. for one hour. The elastomeric core, consisting of latex particles having a Coulter diameter of 77 mm, is obtained with a 97% conversion.

Added to the reaction mixture obtained above, maintained at 80° C., with stirring, is 1 g of sodium sulphoxylate formaldehyde in 5 g of water. Next, 279.9 g of methyl methacrylate and, moreover, 0.825 g of diisopropyl benzene hydroperoxide in 275 g of water are added over a period of 1 hour.

The contents of the reactor are maintained at 80° C. for 1.5 hours after the start of the methyl methacrylate addition, and 0.5 g of tert-butyl hydroperoxide and 0.175 g of sodium bisulphite in 10 g of water are added to the said contents.

Next, the reaction mixture is maintained at 80° C. for 1 hour. After this period, the contents of the reactor are cooled to room temperature.

A latex of the grafted copolymer, the average particle diameter of which is 85 mm and the solids content of which is 39.9%, is obtained with a 96.4% conversion. Analysis of the polymer obtained shows that it has two $T_g$s, one located at −38° C. and the other at 105° C.

Examples 2 and 3

The procedure is the same as in Example 1, except that the composition of the monomers to be polymerized at each step is modified so as to modify the $T_g$s of the copolymers prepared.

The characteristics of the particles of the latices 2 and 3 of Examples 2 and 3 are as follows:

| Latex 2: (Example 2 according to the invention) | |
| --- | --- |
| average particle diameter: | 90 nm |
| $T_g1$: | −49° C. |
| $T_g2$: | 100° C.; |
| Latex 2: Comparative Example 3) | |
| average particle diameter: | 90 nm |
| $T_g1$: | −44° C. |
| $T_g2$: | 33° C. |

Example 4
Preparation of an Unstructured Latex (Comparative Example)

In this example, the latex is unstructured since the polymer P2 is more hydrophobic than P1.

The procedure is carried out in the same way as Example 1 except that the methyl methacrylate is replaced with 279.9 g of styrene.

A latex, the average particle diameter of which is 81 nm and the solids content of which is 40.15%, is obtained with a 99% conversion.

Example 5
Preparation of a Mixture of Two Latices, One with a Soft Character and the Other with a Hard Character (Comparative Example)

Preparation of a latex with a soft character, polybutyl acrylate (PBuA).

The preparation is carried out in a 2-liter reactor fitted with a stirrer, a temperature probe and a jacket through which a heat-transfer fluid circulates in order to keep the reactor at temperature.

Introduced into this reactor, flushed beforehand with nitrogen, maintained at room temperature, and with stirring, are 750 g of demineralized water and 2.4 g of disodium hydrogen phosphate, and then 20.025 g of sodium lauryl sulphate as emulsifier are dissolved in this mixture.

Next, the temperature of the contents of the reactor are heated to 57° C. and, while maintaining this temperature, 495.9 g of n-butyl acrylate and 4.6 g of 1,4-butanediol diacrylate are simultaneously added.

The temperature of the reactor is raised to 66° C. and 0.4625 g of sodium bisulphite dissolved in 15 g of water and 0.65 g of sodium persulphate dissolved in 15 g of water are added to the reaction mixture.

After an induction time of about 15 minutes, the temperature rises to 114° C. Next, the reaction mixture is maintained at 80° C. for one hour. At the end of this period, the contents of the reactor are cooled to room temperature.

A latex, the average particle diameter of which is 82 nm and the solids content of which is 36.90%, is obtained with a 99% conversion.

Preparation of a latex with a hard character, namely polymethyl methacrylate (PMMA).

The procedure is the same as previously, except that the:

750 g of water are replaced with 601 g;

2.4 g of disodium hydrogen phosphate are replaced with 1.76 g;

20.025 g of sodium lauryl sulphate are replaced with 14.7 g;

495.9 g of n-butyl acrylate are replaced with 501.4 g of methyl methacrylate;

4.6 g of butanediol diacrylate are replaced with 1.77 g of tetradodecyl mercaptan;

0.4625 g of sodium bisulphite is replaced with 0.24 g;

0.65 g of potassium persulphate is replaced with 0.67 g.

A latex, the average particle diameter of which is 81 nm and the solids content of which is 41.40%, is obtained with a 99% conversion.

The two latices obtained are then mixed so as to have the final composition comprising 80% by weight of polymer with soft character and 20% by weight of polymer with a hard character.

Example 6

Preparation of the Film

The latex coming from Example 1 is applied in thin layers to a glass plate and left to dry at room temperature. After the water has evaporated, a continuous and homogeneous film is obtained which has no surface tack. This film, having a thickness of 300 μm, is cut into rectangular sheets 20 mm in length and 4 mm in width. The rectangular sheets are subjected to a tensile mechanical test at a pull rate of 10 mm per minute. The results obtained are as follows:

| modulus: | 30 MPa |
|---|---|
| yield stress: | 0.7 MPa |
| elongation at break: | 150%. |

Examples 7, 8, 9 and 10

The procedure is the same as in Example 4, except that the latices of Example 1 are replaced with those of Examples 2, 3, 4 and 5.

The films obtained are subjected to the same test as previously. The results obtained are:

in the case of Example 7 (latex No. 2 according to the invention):

| flexible film with no surface tack | |
|---|---|
| elastic modulus: | 80 MPa |
| yield stress: | 2 MPa |
| elongation at break: | 100% | in the case of Example 8 (comparative latex No. 3):

| flexible film with a surface tack | |
|---|---|
| elastic modulus: | 3 MPa |
| yield stress: | 0.45 MPa |
| elongation at break: | 300% | in the case of Example 9 (comparative, unstructured latex No. 4):

| film with surface tack | |
|---|---|
| elastic modulus: | 1 MPa |
| yield stress: | 0.16 MPa |
| elongation at break: | 100% |
| fracture energy: | 0.1 mJ/mm$^3$ | in the case of Example 10 (comparative latex mixture No. 5):

| | |
|---|---|
| elastic modulus: | 2 MPa |
| yield stress: | 0.2 MPa |
| elongation at break: | 300% |
| fracture energy: | 0.1 mJ/mm$^3$ |

E' less than $1\times10^7$ FIG. 3 indicates the presence of surface tack.

What is claimed is:

1. Latex containing no coalescents or volatile organic compounds, forming a film by evaporation at a temperature of less than 40° C., wherein the latex is based on hydrophobic polymer particles having a core/shell structure and consisting of:

70 to 90% by weight of at least one polymer with a soft character having a Tg of less than 20° C., forming the core; and 10 to 30% by weight of at least one polymer with a hard character having a Tg of greater than 50° C., forming the shell, wherein the shell is formed by emulsion polymerization of at least one first monomer, the at least one first monomer being a hydrophobic monomer selected from the group consisting of:

$C_{1-8}$(meth)acrylic acid esters, styrene, chloromethylstyrene, alpha-methylstyrene, conjugated dienes, and vinyl chloride;

further wherein the core is more hydrophobic than the shell.

2. Latex according to claim 1, wherein the core has a Tg of less than 0° C. and the shell of Tg of greater than 60° C.

3. Latex according of claim 1, wherein the polymers are prepared in two steps, the at least one polymer with the soft character being formed in a first step by emulsion polymerization of at least one second monomer, and the at least one polymer with the hard character being formed in a second step by emulsion polymerization of said at least one first monomer, wherein the at least one second monomer is selected from the group consisting of:

90% to 100% by weight of at least one monomer selected from the group I consisting of:
$C_{1-8}$(meth)acrylic acid esters,
vinyl esters of linear or branched carboxylic acids,
styrene,
chloromethylstyrene,
alpha-methylstyrene,
conjugated dienes,
acrylamide,
methacrylamide,
acrylonitrile,
vinyl chloride;
(meth)acrylic acids and
(meth)acrylic anhydrides; and 0% to 10% by weight of at least one monomer selected from the group II consisting of:
allyl esters of unsaturated carboxylic or alpha, beta-decarboxylic acids;
conjugated dienes;
allyl acrylates and allyl methacrylates;
diol diacrylates or dimethacrylates;
polyvinylbenzenes; and
polyallylics.

4. Latex according to claim 1, wherein the temperature at which the film is formed by evaporation is about 25° C.

5. Latex according to claim 2, wherein the polymers are prepared in two steps, the at least one polymer with the soft character being formed in a first step by emulsion polymerization of at least one second monomer, and the at least one polymer with the hard character being formed in a second step by emulsion polymerization of said at least one first monomer, wherein the at least one second monomer is selected from the group consisting of:

90% to 100% by weight of at least one monomer selected from the group I consisting of:
$C_{1-8}$(meth)acrylic acid esters;
vinyl esters of linear or branched carboxylic acids;
styrene,
chloromethylstyrene,
alpha-methylstyrene,
conjugated dienes,
acrylamide,
methacrylamide,
acrylonitrile,
vinyl chloride, and
(meth)acrylic acids and (meth)acrylic anhydrides; and 0% to 10% by weight of at least one monomer selected from the group II consisting of:
allyl esters of unsaturated carboxylic or alpha, beta-decarboxylic acids;
conjugated dienes
allyl acrylates and allyl methacrylates;
diol diacrylates or dimethacrylates;
polyvinylbenzenes; and
polyallylics.

6. Latex according to claim 1, wherein the at least one first monomer is methylmethacrylate, styrene and/or vinyl chloride.

7. Latex according to claim 3, wherein the at least one second monomer is butyl acrylate, butadiene and/or isoprene.

* * * * *